United States Patent
Kuske et al.

(10) Patent No.: US 8,430,950 B2
(45) Date of Patent: Apr. 30, 2013

(54) DEVICE FOR REMOVING FINE-GRAINED OR DUST-LIKE SOLIDS FROM A CONTAINER

(75) Inventors: Eberhard Kuske, Soest (DE); Stefan Hamel, Wenden (DE)

(73) Assignee: ThyssenKrupp Uhde GmbH, Dortmund (DE)

( * ) Notice: Subject to any disclaimer, the term of this patent is extended or adjusted under 35 U.S.C. 154(b) by 298 days.

(21) Appl. No.: 12/736,037

(22) PCT Filed: Feb. 27, 2009

(86) PCT No.: PCT/EP2009/001070
§ 371 (c)(1),
(2), (4) Date: Sep. 24, 2010

(87) PCT Pub. No.: WO2009/109286
PCT Pub. Date: Sep. 11, 2009

(65) Prior Publication Data
US 2011/0296995 A1    Dec. 8, 2011

(30) Foreign Application Priority Data
Mar. 5, 2008  (DE) .................. 10 2008 012 731

(51) Int. Cl.
*B01D 53/14*  (2006.01)
(52) U.S. Cl.
USPC ............. 96/327; 55/462; 55/434; 55/465; 55/442; 55/445; 55/464; 55/459.1
(58) Field of Classification Search ............... 55/462, 55/434, 465, 442, 445, 464, 459.1; 96/327
See application file for complete search history.

(56) References Cited

U.S. PATENT DOCUMENTS

| | | | |
|---|---|---|---|
| 3,053,642 | A | 9/1962 | Huntley et al. |
| 3,817,696 | A | 6/1974 | Hereth |
| 4,448,134 | A | 5/1984 | Foote |
| 4,941,779 | A | 7/1990 | Dewitz et al. |
| 5,101,742 | A | 4/1992 | Sowards et al. |
| 5,106,240 | A | 4/1992 | Dirkse et al. |
| 5,129,766 | A | 7/1992 | Dirkse et al. |
| 2006/0013660 | A1 | 1/2006 | Berggren |

FOREIGN PATENT DOCUMENTS

| | | |
|---|---|---|
| CH | 209 788 | 4/1940 |
| DE | 11 70 988 | 5/1964 |
| DE | 37 05 343 | 9/1987 |
| WO | WO 2008/074632 | 6/2008 |

OTHER PUBLICATIONS

International Search Report.

*Primary Examiner* — Jason M. Greene
*Assistant Examiner* — Dung H Bui
(74) *Attorney, Agent, or Firm* — Collard & Roe, P.C.

(57) ABSTRACT

A device for removal of fine-grained or dust-like solids from a container that is to be pressurized or is pressurized, whereby the container is equipped with a double-walled discharge cone or funnel, avoids the use of porous materials, such as sintered metals or the like, while making available good conveyance properties in the transfer funnel, without restricting the grain sizes of the material, in each instance, whereby even particle-charged gas can be used for conveyance. The gas exit openings are larger than the largest particles of the solid to be removed, and the gas exit openings are provided with a pipe connector or gas feed channel that projects into the interior of the ring chamber and has at least one angle with an imaginary horizontal plane, and the gas feed channel is part of a retention device for preventing solid from trickling into the ring chamber.

9 Claims, 4 Drawing Sheets

DEVICE FOR REMOVING FINE-GRAINED OR DUST-LIKE SOLIDS FROM A CONTAINER

Figure 1:
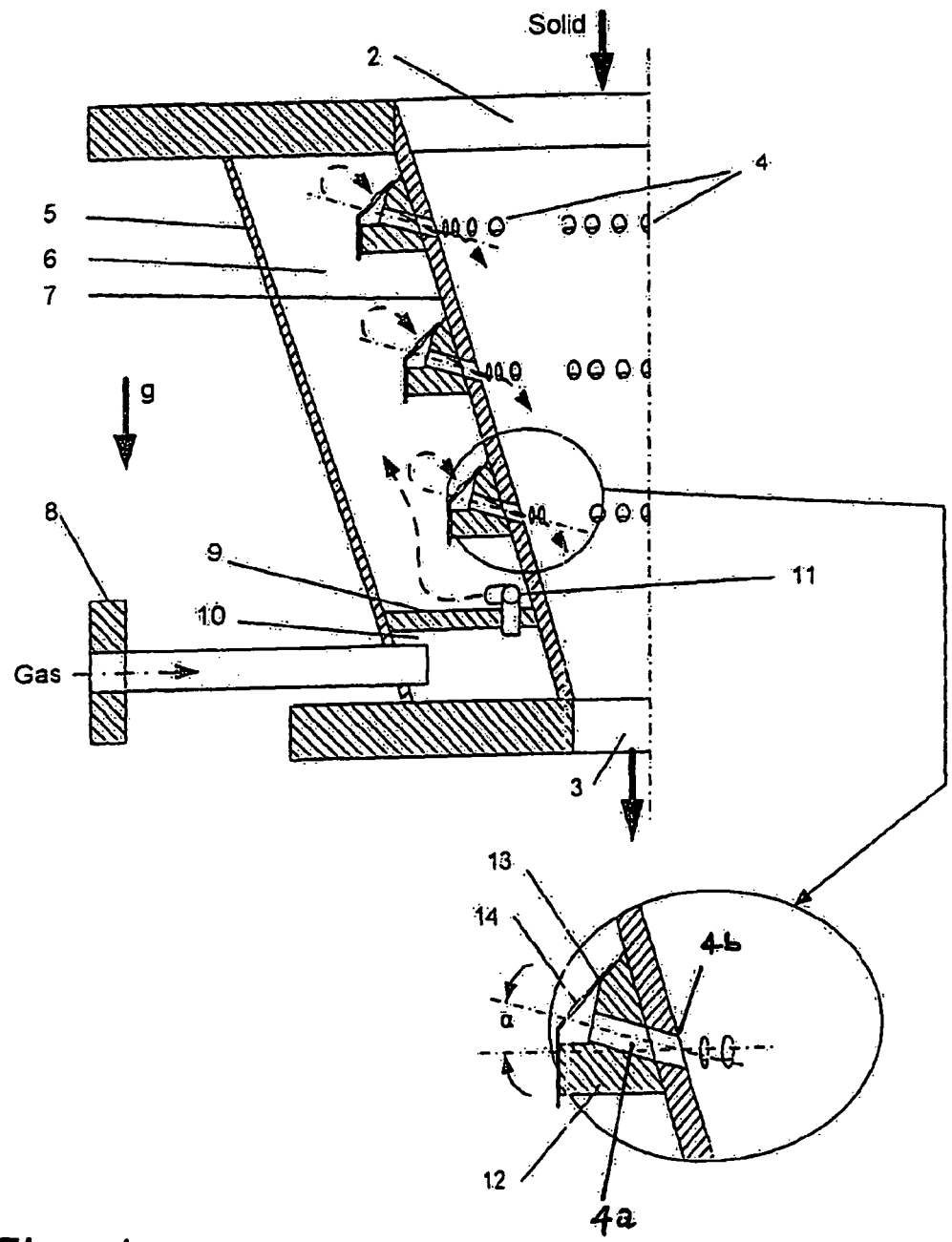

The invention is directed at a device for removing fine-grained or dust-like solids from a container that is to be pressurized or is pressurized.

In the thermal conversion of solid fuels, such as different types of coal, peat, hydrogenation residues, residual materials, waste materials, biomasses, and flue ash, or a mixture of the aforementioned substances, under elevated pressure, there is a need to bring the materials used, which are stored at normal pressure and ambient conditions, to the pressure level of thermal conversion, in order to allow conveyance into the pressure reactor. Possible thermal methods can be, for example, pressurized incineration or pressurized gasification according to the fluidized bed method or the entrained gasification method.

For this purpose, conveyance and interim storage of finely ground fuels are required. In order to bring the fuel to the pressure level of the reactor, compartment systems are generally used, in which the fuel is brought to pressure in containers that follow one another. A decisive criterion for operational reliability in this connection is reliable emptying of the containers, even after they have been brought to high system pressures. Fundamentally, different approaches are possible for removing micro-grained and fine-grained solids from a container:

Frequently, in large silos that are under atmospheric pressure, the solid is drawn off using mechanical devices, such as clearing arms, etc., for example.

Fundamentally, the solid bulk material can be converted to the fluidized bed state by means of feeding in gas counter to the force of gravity. The fluidized bed then acts similar to a fluid, and can run out by way of run-off openings, lateral taps, etc. It is disadvantageous that large amounts of gas are required. An additional difficulty is that very fine particles are extremely difficult to convert into a homogeneous fluidized bed.

Another possibility for allowing removal of solids from a container consists in providing conical run-off geometries, taking the bulk material properties into consideration. Run-off of solids from a cone can be supported by feeding in gas by way of lances (U.S. Pat. No. 5,129,766) or at the cone walls (CH 209 788). The amount of gas is generally smaller than the amount that would be required for fluidization, but is sufficient to increase the wall friction of the bulk material and/or to prevent local deposits that would allow bridge formation. An air-permeable intermediate floor with elastic, automatically closing valve nozzles is shown by DE 11 70 988.

The latter method is the preferred variant in the gasification systems described, in which fine-grained fuel must be handled both under atmospheric pressure and under high pressure. In this connection, the amount of gas required is restricted, and, at the same time, mechanical installations are eliminated.

It is the state of the art to feed gas into the run-off cone by way of porous elements (US 2006/0013660 A1, U.S. Pat. No. 4,941,779). The porous elements preferably consist of sintered metal, but can also consist of other porous media. The use of porous materials brings some disadvantages with it in terms of process technology and operations technology:

The permissible pore size is oriented according to the solid material to be handled, i.e. its particle size distribution. In this connection, the pore size can only be reduced to a reasonable dimension that results from the desired retained particle size and the flow-through pressure loss. In practice, it has been found that the porous medium becomes clogged over the course of time even at very small pore sizes. The reason for this is that the finely ground fuel to be handled has a particle size distribution in which micro-particles are also present, and these can clog the pores. In addition, friction wear effects of the fuel within the container and during handling lead to the result that micro-particles are formed, which can also potentially clog the pores. Although an attempt is made to counteract clogging of the porous medium by applying a permanent gas stream, practice has shown that the useful lifetime of the porous elements can only be increased in this way.

Porous material necessarily has a lesser strength (than comparable solid material), and therefore can only be operated with the application of gas in such a manner that a maximally permissible pressure loss by way of the porous material is not exceeded. Improper handling or non-secured pressure increases in operation can therefore lead to destruction of the porous material.

Another disadvantage of process technology is that porous materials are only allowed to have particle-free gas applied to them. It is not possible to use gas that results from container relaxation and is contaminated with particles, since the porous materials would then clog from the side of the gas feed.

Processing of the porous material in connection with the steels used in conventional container construction requires special abilities and experience in production technology, particularly in the case of high-quality welding of sintered metals, for example.

It is the task of the invention to avoid the use of porous materials, in particular, such as sintered metals or the like, while making available good conveyance properties in the transfer funnel, without restricting the grain sizes of the material, in each instance, whereby even particle-charged gas can be used for conveyance.

This task is accomplished, according to the invention, with a device of the type indicated initially, in that the gas exit openings are larger than the largest particles of the solid to be removed, and that the gas exit openings are provided with a gas feed channel that projects into the interior of the ring chamber and has at least one angle with an imaginary horizontal plane, and that the gas feed channel is part of a retention device for preventing solid from trickling into the ring chamber.

Providing gas exit openings into the interior of the funnel, provided with short gas feed channels, in each instance, whereby the gas used for this purpose is blown in out of a ring chamber that surrounds the funnel, leads to a number of design and operations technology advantages. For example, it is possible to be able to adapt the gas entry directions into the funnel to the requirements, in each instance, with simple means, and also, introduction into the ring chamber of the gas required for conveyance means the possibility of optimal uniformization of the gas distribution, and swirling up of the gas distribution and of the gas and the like. Also, it is advantageous that the gas feed channel is part of a retention element for preventing solid from trickling into the ring chamber. The retention element can be provided on a single gas feed channel, or can be equipped with a plurality of gas feed channels.

Embodiments of the invention are discussed below. In this connection, it can particularly be provided that the end of the gas feed channel that acts on the ring-chamber side lies above or below the exit opening of the gas feed channel into the funnel, in the direction of gravity, and this particularly essentially prevents solid from getting to the outside, by way of the openings in the funnel wall, particularly into the ring chamber for gas feed.

To optimize the gas entry and, at the same time, to additionally prevent solid from trickling back, it can be provided that each retention element is provided with gas distribution openings or gas entry openings that lie above the gas exit openings in the direction of gravity. In this connection, the retention elements can be configured in ring shape or angled in cross-section.

In order to achieve an advantageous gas distribution, for one thing, and also to ensure that any solid that has trickled in nevertheless can be swirled up and conveyed back into the funnel by way of the conveyance gas, it is provided that injection of the gas into the ring chamber takes place at the lower active floor, in a direction, preferably tangential, that leads to an eddy-like flow in the ring chamber and to swirling up of any solid particles that might be situated there.

In another embodiment, it can be provided that the ring chamber is equipped with a double floor for forming a lower partial ring chamber, in the direction of gravity, having at least one gas feed and one or a plurality of gas exit nozzles on the inner ring chamber floor.

Another variant can consist, according to the invention, in that the ring chamber is divided into ring chamber segments by means of a plurality of floors, whereby at least one of the plurality of gas exit openings distributed over the circumference and at least one gas feed are assigned to each segment.

Another variant can consist in that the gas feed is undertaken by way of ring lines on the floor of the ring chamber, in each instance.

If, as the invention also provides in another embodiment, gas feed slits are provided in place of perhaps circular gas exit openings, these slits can be disposed, similar to the gas exit openings, in horizontal rows on the circumference of the funnel, if necessary offset relative to one another, whereby the slit configuration can be provided in such a manner that for example, the slit forms an exit angle, relative to the horizontal, opposite gravity or in the direction of gravity, whereby different slit configurations are possible for different media to be conveyed.

The invention also provides for a method using a device wherein the active floor chamber of the ring chamber formed by the double-walled funnel is impacted, by way of gas feed, in such a manner that a flow that swirls up any solids situated in the ring chamber, if necessary, is formed, whereby the swirled-up gas is blown into the inner funnel at an angle to the direction of gravity, by way of gas exit openings having gas feed channels that stand at an angle.

Under some circumstances, multiple cones can be disposed on a container. Furthermore, it can have advantages, in terms of production technology, to provide multiple cones of different sizes in series, if necessary.

Other advantages, details, and embodiments of the invention are evident from the following description and using the drawing. This shows, in FIG. 1 a partial cross-section through a discharge cone of a container that contains solid, not shown in any further detail, FIGS. 1a and 1b in the same mode of representation, modified embodiments of the discharge cone, FIG. 2 another modified embodiment of the discharge cone, and, in FIGS. 3a and 3b additional embodiments of the discharge cone, in the mode of representation according to FIG. 1, in each instance.

The discharge cone 1 shown in FIG. 1 is structured with a double wall. Gas is fed into the ring chamber 6 that is situated between inner wall 7, outer wall 5, intermediate floor 9, and upper flange. The gas is first passed into the lower floor chamber 10, which is situated between inner wall 7, outer wall 5, intermediate floor 9, and lower flange, by way of a gas feed connector and line 8. From there, the gas is distributed into the ring chamber 6 by way of nozzles 11 situated in the intermediate floor 9. Preferably, the nozzles 11 are oriented parallel to the intermediate floor 9 and set tangentially, so that a gas flow with spin occurs in the ring chamber 6. By injecting the gas at an increased speed and spin, and because of the high turbulence, it is possible to swirl up fine solid particles that have been deposited, and to lead them into the bulk material with the gas stream. The lower floor chamber 10 serves for distributing the gas over the nozzles 11, whereby the intermediate floor 9 offers a flat surface, at the same time, from which deposited dust particles can be removed by the gas flow.

The variant shown in FIG. 1, with intermediate floor 9, nozzles 11, and lower floor chamber 10, is particularly advantageous if bulk material having larger particle diameters is involved, which requires a high speed and as undisrupted an inflow as possible so that it can be swirled up from the floor. In the case of fine to dust-like bulk material, variants of the gas feed into the ring chamber that are simple in design can be used, and these are shown in FIGS. 1a and 1b.

Figure 1A:
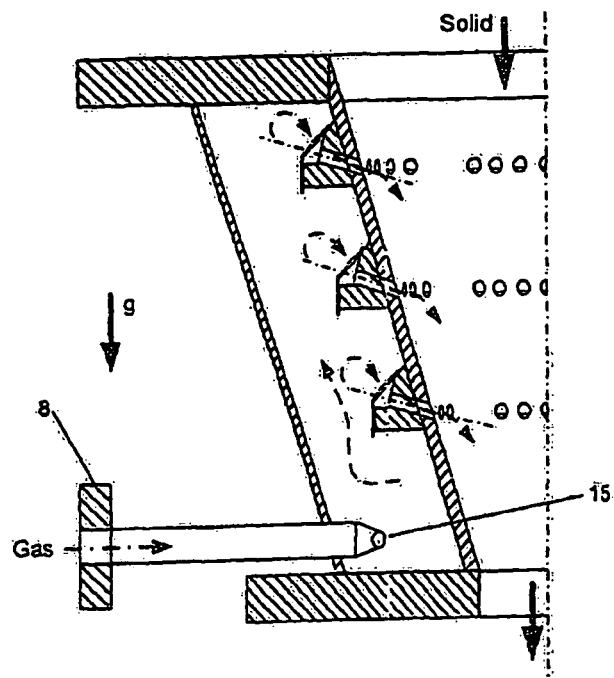
Figure 1B:
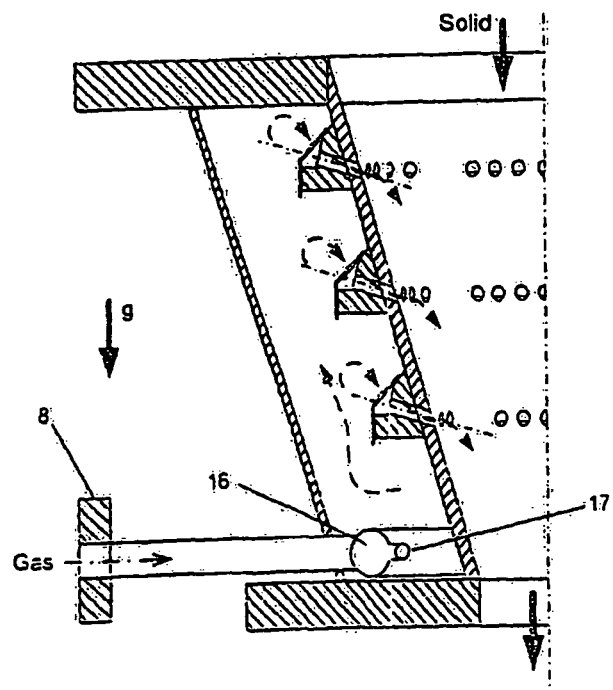

In FIG. 1a, the gas feed takes place directly by way of the gas feed connector 8, at the end of which, in the ring chamber 6, a deflection nozzle 15 is provided, in order to give the exiting gas a tangential orientation, whereby a gas feed connector 8 with deflection nozzle can be provided multiple times. Another variant of the gas feed is shown in FIG. 1b, in which gas is supplied to a ring line 16 that is situated in the ring chamber 6, by way of the gas feed connector 8. From the ring line 16, the gas is injected into the ring chamber 6, preferably in a tangential direction, by way of nozzles 17. The orientation of the nozzles 11, 15, 17 takes place preferably tangentially and horizontally (with reference to the gravitational field), but can also be oriented in deviation from the tangent, up to 45° in the radial direction, and/or up to 45° upward from the horizontal.

The gas feed openings 4 with their gas feed channels 4a are configured, according to the invention, in such a manner that they are significantly larger than the largest particle diameter of the solid, for example at least three times larger than the largest particle diameter. The gas feed openings 4 are provided with a retention device 12 in the ring chamber 6, which device has the task of stopping solid that flows back.

A preferred embodiment of this retention device 12 is shown in FIG. 1. The retention device can accordingly consist of a ring, which is easy to produce, and which is lathed at such an angle that it has surface contact with the conical inner wall 7. The ring-shaped configuration furthermore has the advantage that its outer surface can be lathed at any desired angle relative to the vertical, so that bores of any desired angle can be passed through retention device 12 and inner wall 7 at the same time, in simple manner. In this way, the gas feed opening 4 can be structured with any desired work angle, in very simple manner, in terms of production technology, and thereby retention of the solid is promoted (see, for example, detail in FIG. 1). The ring-shaped configuration of the retention device 12 makes it possible to affix a large number of bores on the circumference, and to provide bores, in the case of multiple rings, also over the height, on multiple planes; in FIGS. 1 and 2, for example, three planes for gas feed openings 4 are shown. The ring-shaped retention devices 12 furthermore reinforce the conical inner wall 7.

Figure 2:
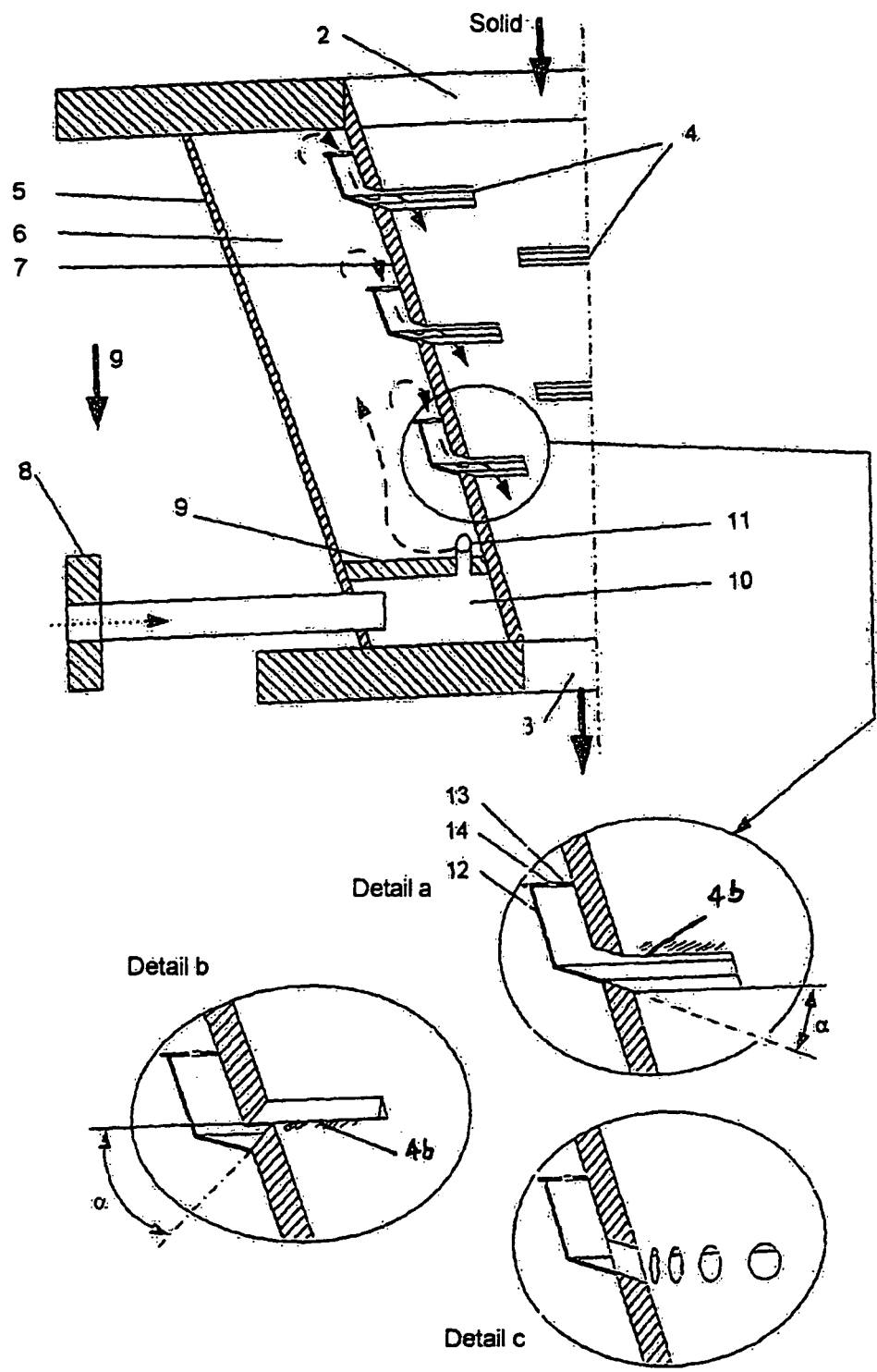
Figure 3A:
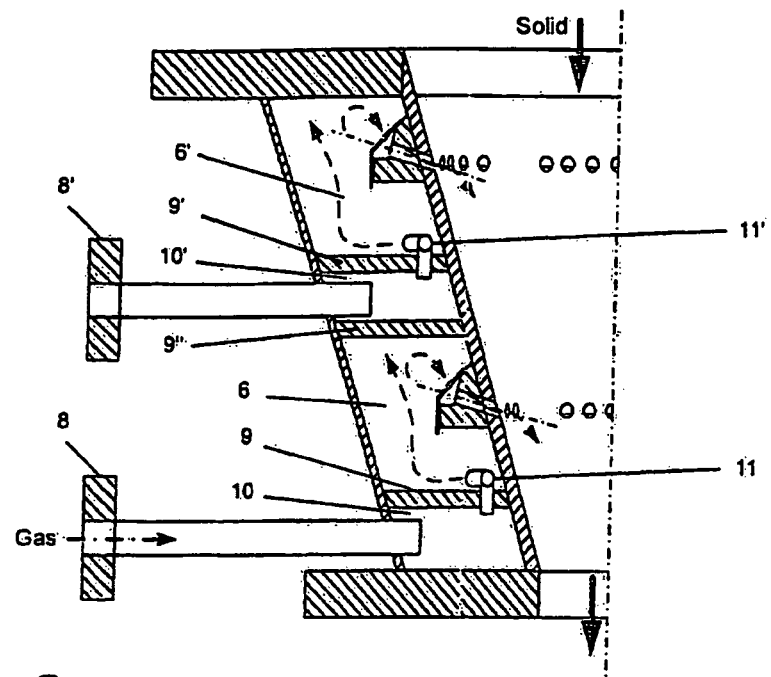
Figure 3B:
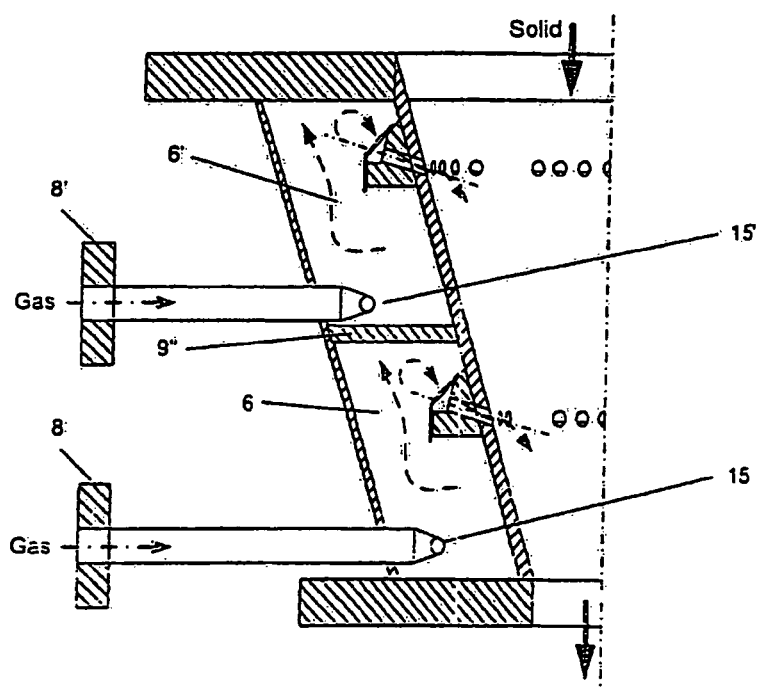

Another possibility of configuration is shown in FIG. 2. The gas feed openings 4 are configured as slits here, for example, which can be angled relative to the horizontal in the same manner as the bores (see Details a to c in FIG. 2). The retention device 12 is affixed alternatively here, for example as an angled metal sheet behind the gas feed openings 4.

Furthermore, in the advantageous embodiment, a gas distributor device 13 is provided, which covers the side of the retention device 12 that faces the ring chamber 6. The gas distributor device 13 is itself provided with gas entry openings. Each retention device 12, either in ring shape (FIG. 1) or in angled shape (FIG. 2), has a defined number of gas feed openings 4 assigned to it. The main task of the gas distributor device 13 is to bring about gas distribution to gas feed openings assigned to the individual retention devices, during operation. For this purpose, the pressure loss of each gas distributor device 13 can be adjusted by means of a suitable selection of the inflow opening 14. Thus, uniform distribution to all the gas feed openings can be achieved, or the gas feed to each retention device can be adjusted in targeted manner, with the related gas feed openings. Thus, the different pressure conditions that occur due to different heights of the gas feed openings in the cone, for example, can be taken into account in simple manner.

If a gas distribution, in terms of amount, that can no longer be implemented merely by way of adjusting the pressure loss of the gas distributor device 13 is required, there is furthermore the possibility of inserting two additional separating floors 9', 9" for forming a second lower floor chamber 10' with a separate gas feed 8', nozzles 11' (see FIG. 3). In this connection, the second gas feed 8' and the second ring chamber 6' are spatially separated from the first ring chamber 6, and the two gas feeds can have individual amounts of gas applied to them. Furthermore, the division of gas, for example from a common supply line, to the two gas chambers 6, 6' can be adjusted by means of perforated covers on the gas feed connectors 8, 8'.

Another possibility for varying the amount of gas by way of the cone height in a container consists in placing two or more of the devices according to the invention one on top of the other (not shown). The diameters at the transition point must be adapted in such a manner that the inner walls follow the cone angle in seamless manner.

Of course, the invention is not restricted to the above exemplary embodiment, but rather can be modified in many different respects, without departing from the fundamental idea.

The invention claimed is:

1. Device for removing fine-grained or dust-like solids from a container that is to be pressurized or is pressurized, whereby the container is equipped with a double-walled funnel, having at least one gas feed into a ring chamber formed by the double-walled funnel, whereby the funnel wall that faces the funnel interior is provided with gas exit openings, wherein the gas exit openings are larger than the largest particles of the solid to be removed, and
wherein the gas exit openings are provided with a pipe connector or gas feed channel that projects into the interior of the ring chamber and has at least one angle with an imaginary horizontal plane, and
wherein the gas feed channel is part of a retention device for preventing solid from trickling into the ring chamber, and
wherein injection of gas into the ring chamber at a lower active floor takes place in a tangential direction that leads to an eddy-like flow in the ring chamber and to swirl up of any solid particles that might be situated there.

2. Device according to claim 1, wherein the end of the gas feed channel that acts on the ring-chamber side lies above or below the exit opening of the gas feed channel into the double-walled funnel, in the direction of gravity.

3. Device according to claim 1, wherein at least one retention device having at least one gas feed channel is provided.

4. Device according to claim 3, wherein a plurality of retention device are provided, wherein each retention device is provided with gas distribution or gas entry openings that lie above the gas exit openings in the direction of gravity, whereby the gas distribution or gas entry openings have a diameter that is larger than the particle diameter.

5. Device according to claim 1, wherein the ring chamber is equipped with at least one double floor for forming a lower partial ring chamber, in the direction of gravity, having at least one gas feed and having one or a plurality of gas exit nozzles on the inner ring chamber floor.

6. Device according to claim 1, wherein the ring chamber is divided into ring chamber segments by means of a plurality of floors, whereby at least one of the plurality of gas exit openings distributed over the circumference and at least one gas feed are assigned to each segment.

7. Device according to claim 1, wherein ring lines are provided in the ring chamber for feed of gas into the ring chamber.

8. Device according to claim 1, wherein the exit openings in the funnel wall are configured as slits, whereby the length of the slits amounts to less than 50% of the circumference length of the funnel wall.

9. Method using a device according to claim 1, wherein the active floor chamber of the ring chamber formed by the double-walled funnel is impacted, by way of gas feed, in such a manner that a flow that swirls up any solids situated in the ring chamber, if necessary, is formed, whereby the swirled-up gas is blown into the inner funnel at an angle to the direction of gravity, by way of gas exit openings having gas feed channels that stand at an angle.

* * * * *

UNITED STATES PATENT AND TRADEMARK OFFICE
CERTIFICATE OF CORRECTION

PATENT NO.        : 8,430,950 B2
APPLICATION NO.   : 12/736037
DATED             : April 30, 2013
INVENTOR(S)       : Kuske et al.

It is certified that error appears in the above-identified patent and that said Letters Patent is hereby corrected as shown below:

In the Claims:

In Column 6, line 23 (line 2 of Claim 4) please change "retention device" (first occurrence) to:
--retention devices--.

Signed and Sealed this
Twentieth Day of August, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,430,950 B2 Page 1 of 1
APPLICATION NO. : 12/736037
DATED : April 30, 2013
INVENTOR(S) : Kuske et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 315 days.

Signed and Sealed this
Eighth Day of September, 2015

Michelle K. Lee
*Director of the United States Patent and Trademark Office*